United States Patent [19]

Takahashi

[11] Patent Number: 5,420,610
[45] Date of Patent: May 30, 1995

[54] SCREEN DISPLAY CIRCUIT APPARATUS

[75] Inventor: Naoki Takahashi, Itami, Japan

[73] Assignee: Mitsubishi Denki Kabushika Kaisha, Tokyo, Japan

[21] Appl. No.: 206,379

[22] Filed: Mar. 7, 1994

[30] Foreign Application Priority Data

Mar. 16, 1993 [JP] Japan .................................. 5-055651

[51] Int. Cl.⁶ .............................................. G09G 1/06
[52] U.S. Cl. ..................................... 345/195; 345/143; 345/115
[58] Field of Search ............... 345/116, 26, 143, 192, 345/193, 194, 195, 201, 115, 141; 395/150, 151

[56] References Cited

U.S. PATENT DOCUMENTS

| | | |
|---|---|---|
| 3,821,730 | 6/1974 | Carey . |
| 4,199,757 | 4/1980 | Ichimi ................................ 345/141 |
| 4,314,357 | 2/1982 | Kimura ............................... 345/141 |
| 4,408,197 | 10/1983 | Komatsu ............................ 345/201 |
| 4,684,936 | 8/1987 | Brown ................................ 345/116 |
| 4,956,640 | 9/1990 | Jundanian .......................... 345/201 |

Primary Examiner—Curtis Kuntz
Assistant Examiner—Minsun Oh
Attorney, Agent, or Firm—Lowe, Price, LeBlanc & Becker

[57] ABSTRACT

A screen display circuit apparatus comprising a plurality of screen display circuits for displaying stored font data as display patterns is provided, whereby the variation of displays is increased, e.g., characters can be shifted or overwritten, etc. when displayed.

6 Claims, 7 Drawing Sheets

FIRST CHARACTER ROM 5

SECOND CHARACTER ROM 15

Fig. 5

FIRST CHARACTER ROM 5

SECOND CHARACTER RAM 24

Fig. 6

FIRST
CHARACTER
ROM 5

⊕

SECOND
CHARACTER
RAM 24

SCREEN DISPLAY CIRCUIT APPARATUS

BACKGROUND OF THE INVENTION

1. Field of the Invention

The present invention relates to a screen display circuit apparatus for displaying a dot pattern of characters, symbols, etc. on the television (TV) screen.

2. Description of Related Art

Figure 1:
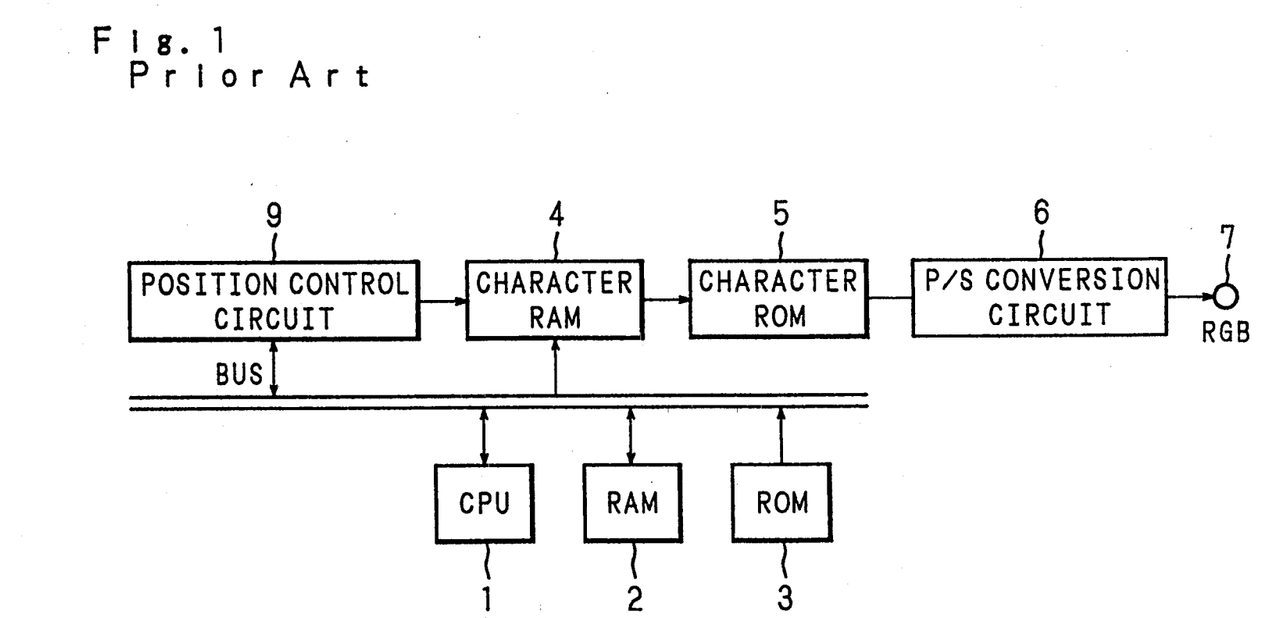
FIG. 1 is a block diagram showing a conventional screen display circuit apparatus.

FIG. 1 is a block diagram showing tile configuration of a conventional screen display circuit. In FIG. 1, numeral 1 indicates a CPU, 2 a RAM in which a data of character disposition for display is written, 3 a ROM for storing a system program and a screen display program, 4 a character RAM in which data for determining the outputting order of character data is written, 5 a character ROM for storing font data of a plurality of characters, 9 a position control circuit for controlling the outputting timing of the font data from the character ROM 5 in accordance with the screen display position of the display pattern generated by the character RAM 4 and the character ROM 5, 6 a parallel/serial conversion circuit (hereinafter referred to as the "P/S conversion circuit") for converting the parallel output of the character ROM 5 into serial data, and 7 an RGB output terminal connected with an RGB terminal of the TV cathode ray tube not shown.

Now, the operation will be explained.

In accordance with the system program of the ROM 3, the CPU 1 is driven to write the screen display program in the RAM 2. The CPU 1 transfers the data for determining the displaying order of characters in accordance with an external signal from the RAM 2 to the character RAM 4. Assuming that the font data [A] is stored at an address 1, [B] at an address 2, [C] at an address 3 and [D] at an address 4 of the character ROM 5, for example, when the data to display characters in the order of the addresses 1 to 3 to 2 to 4 is transferred to the character RAM 4, the character ROM 5 outputs the parallel data of the characters in the order from A to C to B to D to the P/S conversion circuit 6. The outputting timing at this time is controlled by the position control circuit 9 in accordance with the screen display position of the display pattern. The information on the screen display position is input to the position control circuit 9 from the ROM 3 in accordance with an external signal.

The P/S conversion circuit 6 converts the parallel output from the character ROM 5 into serial data. The serial data "ACBD" is outputted from the RGB output terminal 7, the information "ACBD" is inputted from the RGB terminal, and the character "ACBD" is accordingly displayed on the TV screen.

The channel number, sound volume, menu, etc. have so far been commonly displayed on the TV screen. In recent years, a variety of displays has been increasingly demanded to allow easy-to-see display including a multiwindow display as high in quality as a personal computer.

The conventional screen display circuit described above, however, cannot meet the aforementioned demand. For example, it is impossible in the conventional circuit to shift or superpose the characters, symbols, etc. on the screen during the display.

SUMMARY OF THE INVENTION

The invention has been developed in order to obviate the above-mentioned problems and the object thereof is to provide a screen display circuit apparatus fabricated on a single chip at low cost and allowing a wide variety of displays including overwriting of characters.

A screen display circuit apparatus according to the invention comprises a plurality of screen display circuits each for generating a display pattern, a position control circuit for controlling the outputting timing of the display pattern data from the screen display circuit in accordance with the display position of each display pattern, and a composing circuit for obtaining a logical sum of a plurality of display patterns. A plurality of display patterns generated by a plurality of the screen display circuits are thus composed to shift or overwrite characters, Each of the screen display circuits includes a font data storage ROM, so that one fixed display pattern is overwritten on another fixed display pattern by the use of the font data stored in the ROM in advance. A ROM in which IC patterns occupy a small area can store many kinds of font data efficiently.

Further, the screen display circuit apparatus described above comprises a screen display circuit including a font, data storage ROM to generate a display pattern by the use of a fixed pattern, and a screen display circuit including a font data storage RAM to generate a display pattern by the use of a freely prepared pattern. As a result, a free display pattern is overwritten on a fixed display pattern.

The above and further objects and features of the invention will more fully be apparent from the following detailed description with the accompanying drawings.

DESCRIPTION OF THE PREFERRED EMBODIMENTS

The invention will be described in detail below with reference to the drawings showing embodiments thereof.

Figure 2:
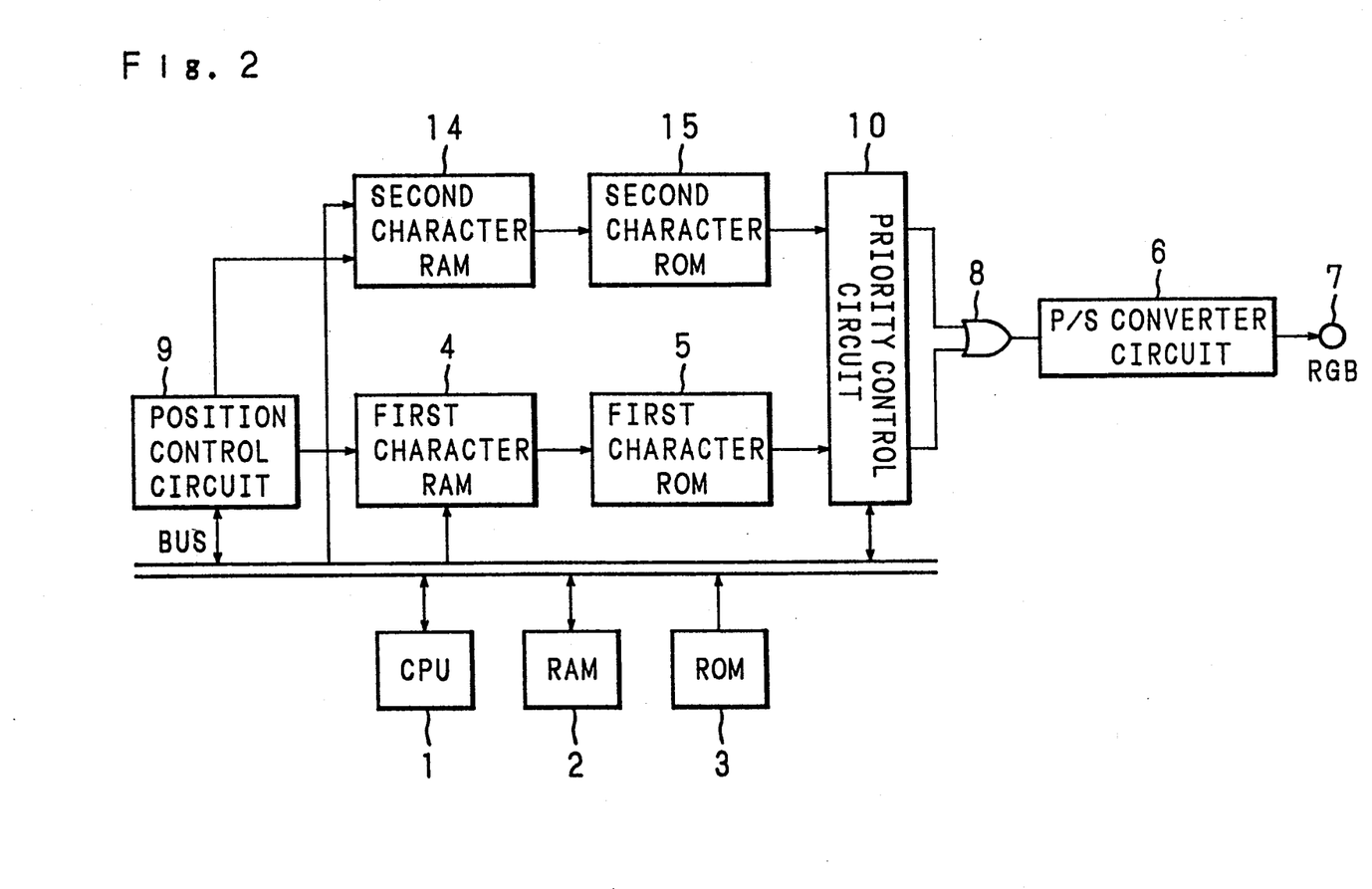
FIG. 2 is a block diagram representing a first embodiment of an apparatus according to the invention.

A block diagram of FIG. 2 shows the configuration of a screen display circuit apparatus (hereinafter referred to as "the apparatus according to the invention") according to a first embodiment of the invention. In the diagram, numeral 1 shows a CPU, numeral 2 a RAM to which a data of character disposition for display is written, numeral 3 a ROM for storing a system program and a screen display program, numerals 4, 14 first and second character RAMs into which data for determining the outputting order of character data is written, numerals 5, 15 first and second character ROMs for storing the font data of a plurality of characters, and numeral 9 a position control circuit for controlling the outputting timing of the font data from the first and second character ROMs 5 and 15 in accordance with the screen display position of the generated screen pattern.

According to the embodiment under consideration, in addition to the first character RAM 4 and the first character ROM 5, there are provided another set of a second character RAM 14 and a second character ROM 15 to generate two display patterns. The information on the screen display position of the two display patterns is fed to the position control circuit 9 from the ROM 3. The position control circuit 9 supplies to the first and second character RAMs 4, 14 a signal for controlling the outputting timing of the font data from the character ROM in accordance with the supplied information on the screen display position. In consequence, the two display patterns generated by the first and second character RAMs 4, 14 and the first and second character ROMs 5,15 are input to a priority control circuit, 10.

The priority control circuit 10, which is a circuit for controlling which of the display patterns is to be displayed up, masks the font data of an overlapped portion of the low-priority display pattern based on the priority information input from the CPU 1. The high-priority display pattern and the masked display pattern are sent to an OR circuit 8, and after being combined at the OR circuit 8, the pattern is further applied to a parallel/-serial converter circuit (hereinafter referred to as "the P/S converter circuit") 6. The P/S converter circuit 6 is a circuit for converting the parallel output of the character ROM 5 into serial data. The combined serial data converted at the P/S converter circuit 6 is outputted to the RGB output terminal 7 connected to the RGB terminal of the TV cathode ray tube not shown.

Now, the operation will be explained.

Supposing that font data [A], [B], [C] and [D] are written at addresses 1, 2, 3 and 4 of the first and second character ROMs 5, 15, respectively, in the case where data for displaying characters in the order of addresses 1→3→2→4 is written in the first character RAM 4 and data for displaying characters in the order of address 4→3→2→1 is loaded in the second character RAM 14, then parallel data of the characters A, C, B and D are produced in that order from the first character ROM 5, while the parallel data of each character is output in the order from the character D→C→B→A from the second character ROM 15.

To the position control circuit 9 is supplied information on the screen display position of the respective display patterns from the ROM 3. The information includes the display position on the TV screen of the character A displayed first of the display pattern generated by the first character RAM 4 and the first character ROM 5, and the display position on the TV screen of the character D displayed first of the display pattern generated by the second character RAM 14 and the second character ROM 15. The font data from the first and second character ROMs 5, 15 are output ted to a priority control circuit 10 at the outputting timing determined in accordance with the information of the display position. As a result, the characters "ACBD" and "DCBA" generated by the first and second character ROMs 5, 15 are overwritten one on the other while the starting position of writing is shifted.

In the process, priority information is given to the priority control circuit 10. In accordance with the display priority of font data outputted from the first and second character ROMs 5, 15, the font data of low-priority characters displayed at the display position of the font data of high-priority characters are masked. In other words, the high-priority display pattern is displayed over the low-priority display pattern by so processing the font data of the overlapped portion of the low-priority display pattern as not to be displayed.

The serial data of the display pattern processed in the above way are sent to the OR circuit 8, where a logical sum of the data is obtained. The serial data thus combined is converted into parallel data at the S/P converter circuit, and output from the RGB output terminal 7. The information on the display pattern thus combined is fed to the TV screen.

Figure 3:
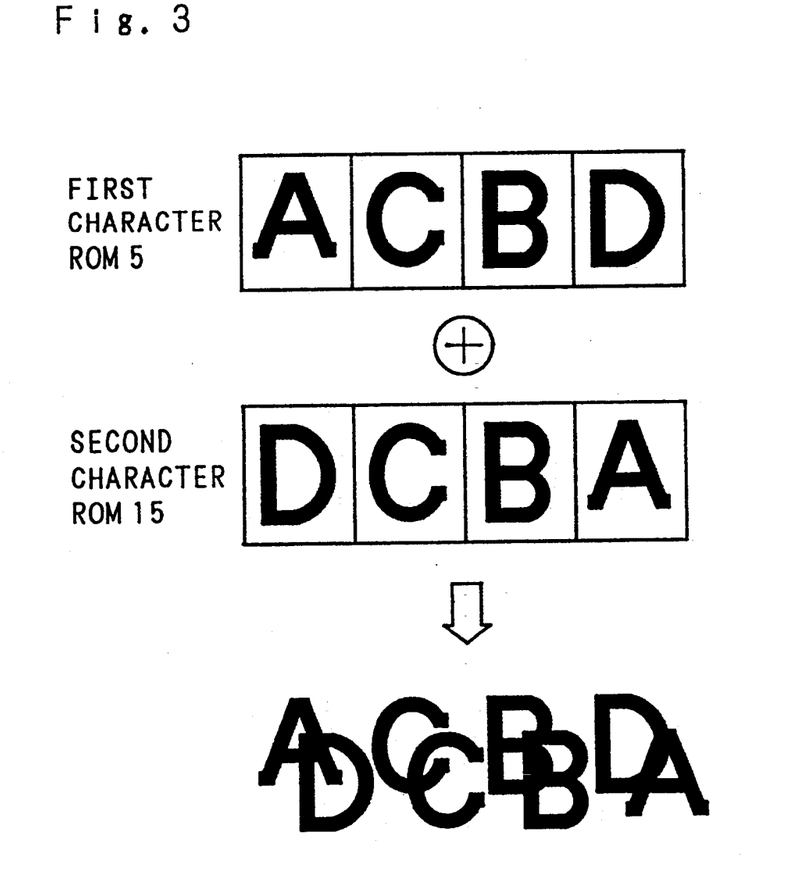
FIG. 3 is a diagram for explaining the overwrite operation according to the first embodiment.

FIG. 3 is a diagram showing an example of an overwritten screen display as discussed above, in which tile "ACBD" generated by the first character ROM 5 is higher in priority and the "DCBA" generated by the second character ROM 15 is lower in priority.

Figure 4:
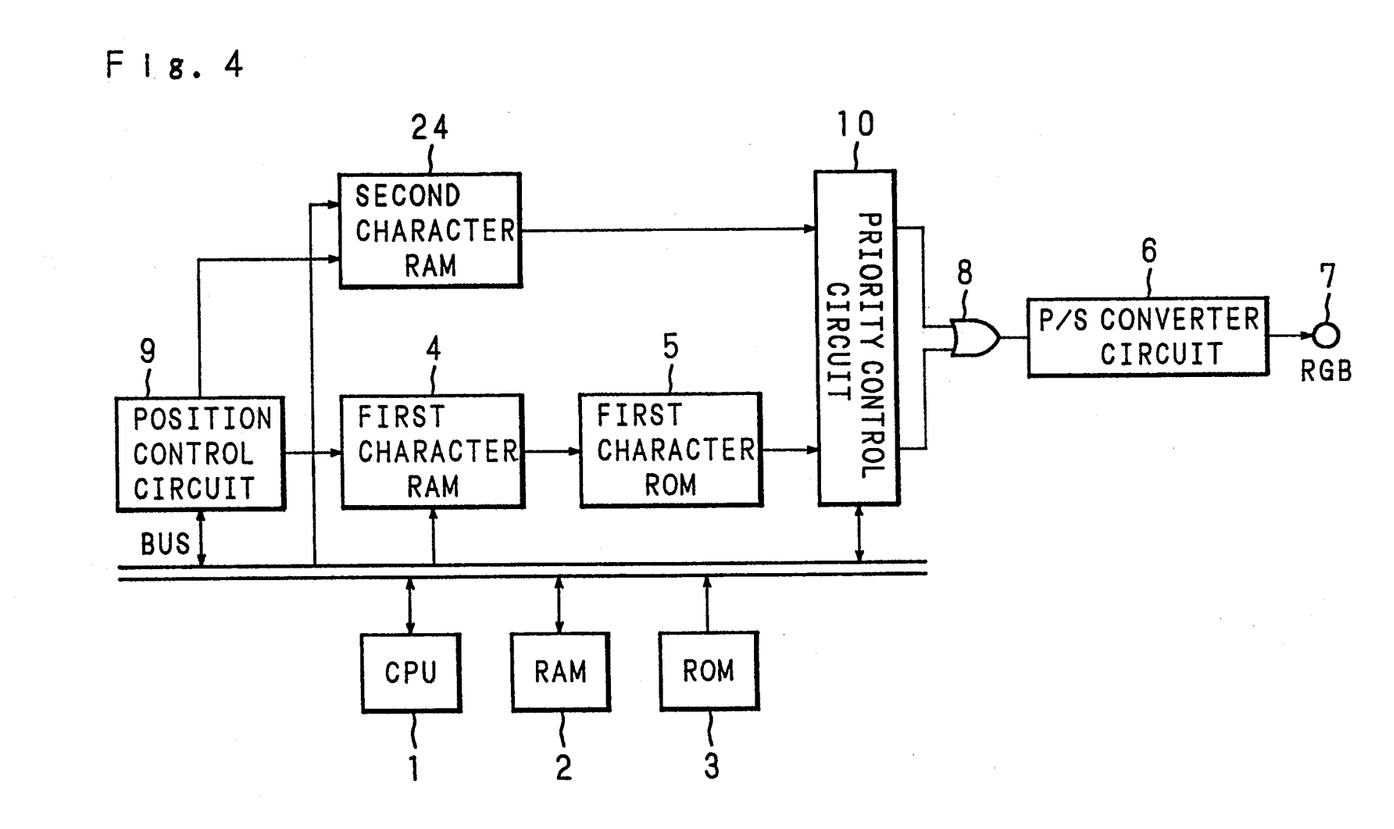
FIG. 4 is a block diagram showing an configuration of an apparatus according to a second embodiment of the invention.

FIG. 4 is a block diagram showing the configuration of an the apparatus according to the second embodiment of the invention. The component parts identical or equivalent, to those in the prior art or the first embodiment are designated by the same reference numerals respectively as those of the first embodiment and will not described again.

According to the embodiment, a second character RAM 24 is provided in addition to the first character RAM 4 and the first character ROM 5. The first character ROM 5 stores the font data of characters beforehand, while the second character RAM 24 has font data of characters written by the CPU 1, the font data in the second character RAM is therefore rewritable.

For a screen display with a variety of display patterns, when the font data of display patterns are stored in the first character ROM 5 in advance, high efficiency is obtained because of a small area of IC patterns allotted to the ROM. The storage of a wide variety of font data in the RAM, however, results in low efficiency due to a large area occupied by the IC patterns in the RAM.

In the case where many types of characters are to be displayed, therefore, the display patterns are generated by the use of the first character ROM 5, and for the display of a small number of types of characters, display patterns are generated by writing the font data in the second character RAM 24. In this way, the IC pattern area is restricted to be small to achieve high efficiency. At the same time, font data can be freely written into the second character RAM 24, thereby increasing the variation of displays.

Figure 5:
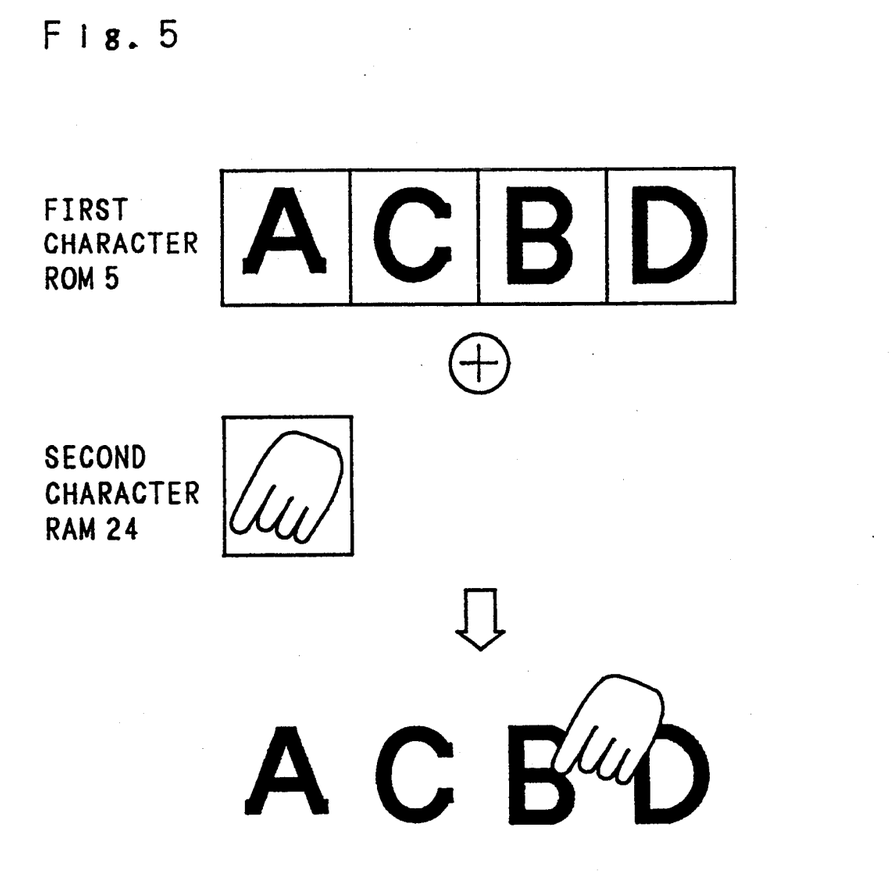
FIG. 5 is a diagram showing an example of a screen display according to the second embodiment.

FIG. 5 is a diagram showing an example of a screen display according to the second embodiment.

The dot pattern of the cursor is formed by the CPU 1, and written into the second character RAM 24. The display priority of the dot pattern is set, high, and the dot pattern is overwritten on the display pattern "ACBD" generated by the first character ROM 5. The cursor pattern thus designates the display pattern "ACBD" as shown in the diagram.

Figure 6:
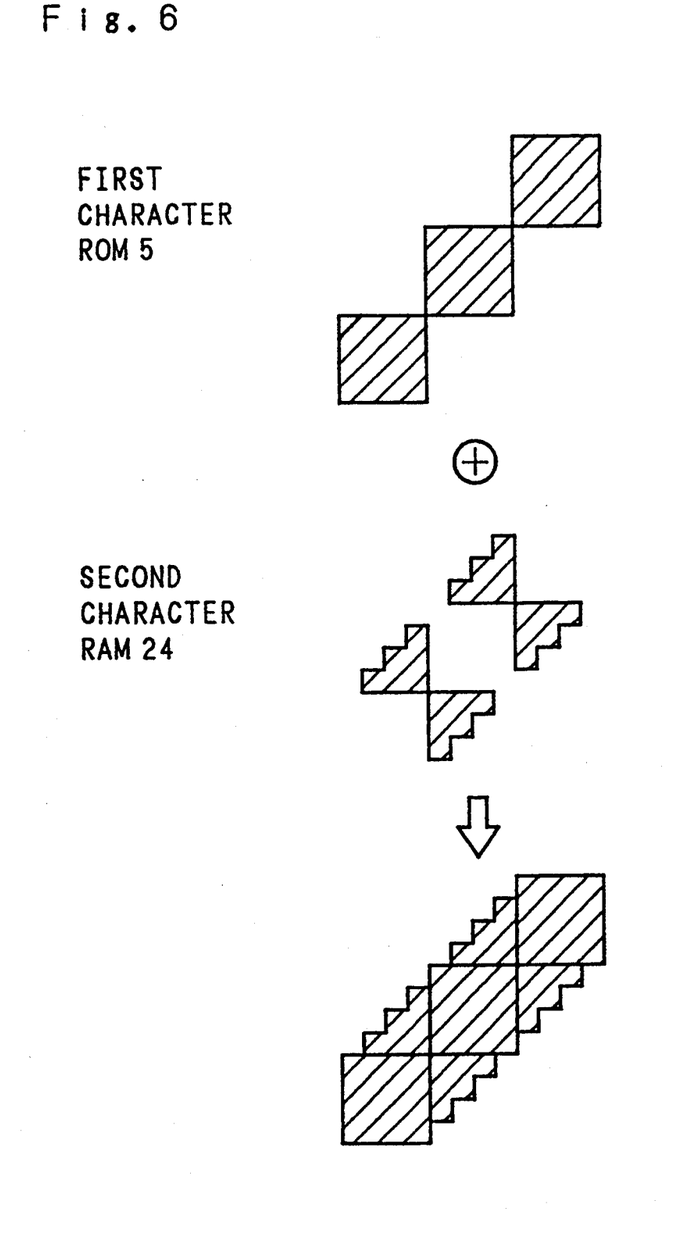
FIG. 6 is a diagram showing an example of a screen display according to a third embodiment.

FIG. 6 is a diagram showing an example of a screen display in the apparatus according to a third embodiment of the invention, in which the circuit structure is the same as that of the second embodiment.

According to the embodiment under consideration, the font data of the first character ROM 5 is combined with that written into the second character RAM 24. As a result, the pattern stored in the first character ROM 5, if the pattern is a character, is corrected into a smooth character. The font data of the second character RAM 24 is rewritable, and therefore a correction pattern corresponding to the pattern from the first character ROM 5 can be written freely.

Figure 7:
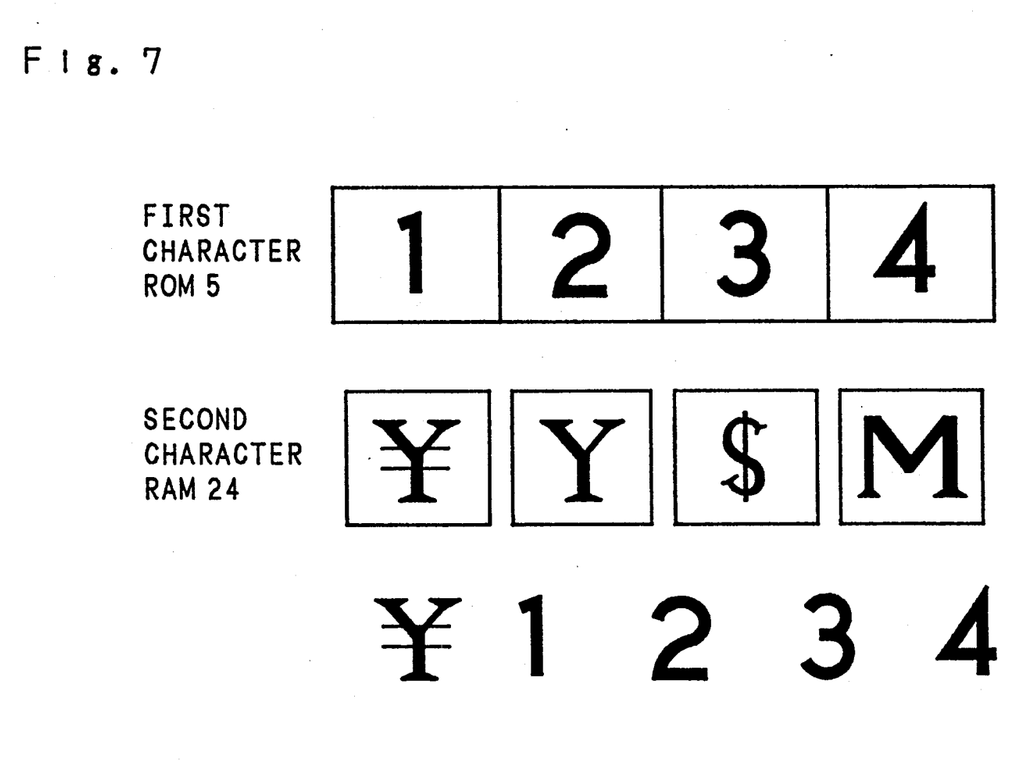
FIG. 7 is a diagram showing an example of a screen display according to a fourth embodiment.

FIG. 7 is a diagram showing an example of a screen display of the apparatus according to a fourth embodiment of the invention. This embodiment has the same circuit structure as the second embodiment.

According to the fourth embodiment, the numerical pattern of the first character ROM 5 is combined with the font data of the currency unit (yen (¥), yuan (Y), dollar ($), mark (M), etc.) written in the second character RAM 24.

As described above, the screen display circuit apparatus according to the invention is capable of overwriting characters by means of a plurality of screen display circuits, and therefore can be produced at low cost with the resulting effect of the widened variation of screen displays.

Also, in the screen display circuit apparatus according to the invention, characters can be overwritten with using a free pattern generated on the RAM in addition to a fixed pattern stored in the ROM, thus accomplishing the great advantage of the widened variation of display patterns.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A screen display circuit apparatus comprising:
a ROM for storing a screen display program;
a CPU for executing the screen display program stored in said ROM;
a plurality of screen display circuits for generating respective display patterns at respective screen display positions on the basis of said screen display program;
a position control circuit for controlling a display position of the respective display patterns received from said plurality of screen display circuits in accordance with the respective screen display positions of said respective display patterns and producing position data; and
a composing circuit for composing the respective display patterns output from the plurality of screen display circuits responsive to the position data generated by said position control circuit
wherein said plurality of screen display circuits include:
a first screen display circuit including a font data storage ROM for storing first font data for generating first display patterns and a data storage RAM into which data related to the displaying order of said font data is written; and
a second screen display circuit including a font data storage RAM into which second font data for generating second display patterns is written,
wherein said position control circuit controls the display position of the first and second font data to display the first and second display patterns together and in a non-overlapping manner.

2. A screen display circuit apparatus according to claim 1, wherein said screen display circuits include:
a plurality of font data storage ROMs for storing font data for generating display patterns; and
a plurality of data storage RAMs into which data related to the displaying order of said font data is written respectively.

3. A screen display circuit apparatus comprising:
a ROM for storing a screen display program;
a CPU for executing the screen display program stored in said ROM;
a plurality of screen display circuits for generating respective display patterns at respective screen display positions on the basis of said screen display program;
a position control circuit for controlling a display position of the respective display patterns received from said plurality of screen display circuits in accordance with the respective screen display positions of said respective display patterns and producing position data;
a composing circuit for composing the respective display patterns output from the plurality of screen display circuits responsive to the position data generated by said position control circuit; and
a priority control circuit for masking the respective display patterns output from said plurality of screen display circuits in accordance with an overwriting priority of the respective display patterns,
wherein one of the respective display patterns is assigned a higher priority than another of the respective display patterns, and the another of the respective display patterns is overwritten by the one of the respective display patterns in overlapping areas.

4. A screen display circuit apparatus according to claim 3, wherein an area of the another of the respective display patterns which is overwritten is not displayed.

5. A screen display circuit apparatus according to claim 4, wherein the one of the respective display patterns visibly dominates the another of the respective display patterns by being written over the another of the respective display patterns.

6. A screen display circuit apparatus according to claim 5, wherein the one of the respective display patterns visibly dominates the another of the respective display patterns by being written over the another of the respective display patterns and by being one of a different contrast and a different color than the another of the respective display patterns.

* * * * *